United States Patent
Koyama

(10) Patent No.: US 12,077,224 B2
(45) Date of Patent: Sep. 3, 2024

(54) MOTOR CONTROL DEVICE AND ELECTRIC POWER STEERING DEVICE

(71) Applicant: Mitsubishi Electric Corporation, Tokyo (JP)

(72) Inventor: Haruna Koyama, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 235 days.

(21) Appl. No.: 17/795,096

(22) PCT Filed: May 7, 2020

(86) PCT No.: PCT/JP2020/018508
§ 371 (c)(1),
(2) Date: Jul. 25, 2022

(87) PCT Pub. No.: WO2021/224958
PCT Pub. Date: Nov. 11, 2021

(65) Prior Publication Data
US 2023/0322295 A1    Oct. 12, 2023

(51) Int. Cl.
| B62D 5/04 | (2006.01) |
| H02K 16/02 | (2006.01) |
| H02P 21/22 | (2016.01) |
| H02P 25/22 | (2006.01) |
| H02P 27/08 | (2006.01) |

(52) U.S. Cl.
CPC ......... B62D 5/0472 (2013.01); H02K 16/02 (2013.01); H02P 21/22 (2016.02); H02P 25/22 (2013.01); H02P 27/08 (2013.01)

(58) Field of Classification Search
CPC ....... B62D 5/0472; H02P 21/22; H02P 25/22; H02P 27/08
See application file for complete search history.

(56) References Cited

U.S. PATENT DOCUMENTS

| 2017/0272019 A1* | 9/2017 | Mori | ....................... H02P 21/00 |
| 2018/0294755 A1* | 10/2018 | Mori | .................... B62D 5/0463 |
| 2019/0006979 A1* | 1/2019 | Suzuki | ................. B62D 5/0463 |
| 2019/0081585 A1* | 3/2019 | Nakamura | ............... H02P 25/22 |
| 2019/0256131 A1* | 8/2019 | Mori | ......................... H02P 6/28 |

(Continued)

FOREIGN PATENT DOCUMENTS

JP    2011-195089 A    10/2011

OTHER PUBLICATIONS

International Search Report for International Application PCT. JP2020/018508 dated Jul. 14, 2020.

*Primary Examiner* — George C Jin
(74) *Attorney, Agent, or Firm* — Sughrue Mion, PLLC; Richard C. Turner

(57) ABSTRACT

A motor control device that enables a reduction of an unpleasant sensation caused by vibration or noise occurring in a motor is obtained. A motor control device including a first control unit that drives a first motor winding and a second control unit that drives a second motor winding is such that the first control unit selects the lower of values of an own power supply voltage and a power supply voltage of the second control unit and outputs a post-selection power supply voltage, and computes a target d-axis current, a target q-axis voltage, and a target d-axis voltage using the post-selection power supply voltage.

13 Claims, 4 Drawing Sheets

(56) References Cited

U.S. PATENT DOCUMENTS

| | | | |
|---|---|---|---|
| 2019/0267925 A1* | 8/2019 | Furukawa | H02P 29/024 |
| 2019/0280629 A1* | 9/2019 | Furukawa | H02P 21/06 |
| 2021/0058018 A1* | 2/2021 | Tsuchimoto | H02P 25/022 |

* cited by examiner

MOTOR CONTROL DEVICE AND ELECTRIC POWER STEERING DEVICE

This application is a National Stage of International Application No. PCT/JP2020/018508 filed May 7, 2020.

TECHNICAL FIELD

The present application relates to the field of a motor control device and an electric power steering device.

BACKGROUND ART

An electric power steering device that assists steering using a motor is known. An electric power steering device including two microcomputers, wherein each microcomputer independently controls a motor by executing current feedback control with respect to a corresponding phase and computing a motor control amount, is disclosed in, for example, Patent Literature 1.

CITATION LIST

Patent Literature

Patent Literature 1: JP-A-2011-195089

SUMMARY OF INVENTION

Technical Problem

However, when a motor is controlled by a motor control amount being computed independently in each system, as in the case of the technology disclosed in Patent Literature 1, there is concern that the motor control amount will differ between systems when voltages of power supplied to a motor driving unit differ. Due to this difference in motor control amounts between systems, vibration or noise may occur in the motor, and there is a problem in that when applied to a motor control device of electric power steering or the like mounted in a vehicle, the vibration or noise occurring in the motor will impart an unpleasant sensation to a driver.

The present application has been made to solve the above problem and an object of the present application is to provide a motor control device that enables a reduction of an unpleasant sensation caused by vibration or noise occurring in a motor, and an electric power steering device.

Solution to Problem

A motor control device disclosed in the present application is a motor control device that drives a motor including a first motor winding and a second motor winding, characterized in that the motor control device includes a first controller that drives the first motor winding and a second controller that drives the second motor winding, each of the first controller and the second controller includes a motor driving circuitry and a control circuitry to which a power supply voltage is supplied, the first controller and the second controller acquire the power supply voltage of the other controller, each of the control circuitries includes a power supply voltage selection circuitry having a minimum value selection circuitry and a d-axis target current computation circuitry, the minimum value selection circuitry selects the lower of a value of an own power supply voltage input into the power supply voltage selection circuitry and a value of the power supply voltage of the other controller, and outputs the selected value from the power supply voltage selection circuitry as a post-selection power supply voltage, the post-selection power supply voltage is input into the d-axis target current computation circuitry, and the d-axis target current computation circuitry outputs a target d-axis current using the post-selection power supply voltage.

Advantageous Effects of Invention

A motor control device disclosed in the present application can reduce an unpleasant sensation caused by vibration or noise occurring in a motor.

DESCRIPTION OF EMBODIMENTS

Figure 1:
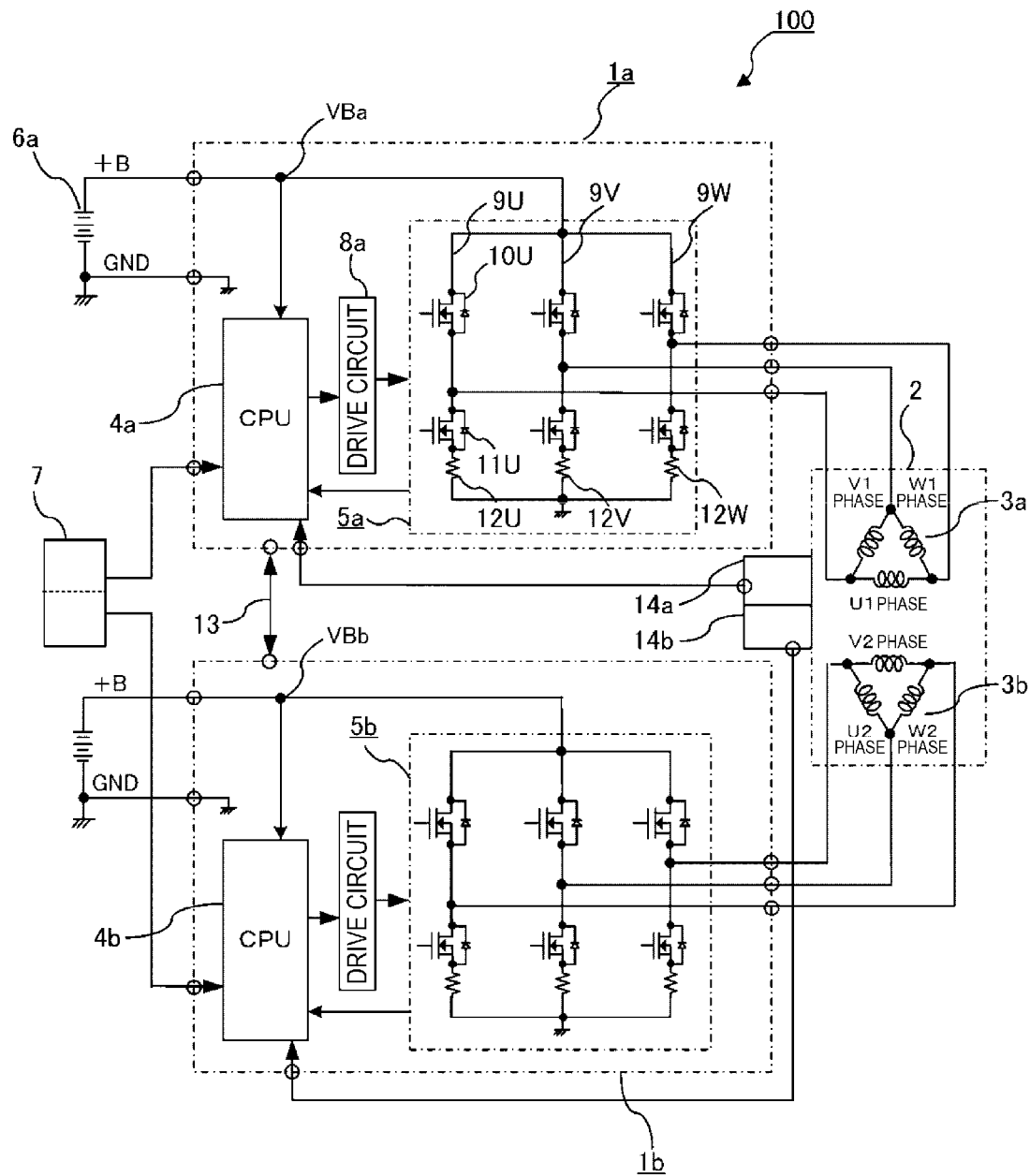
FIG. 1 is a circuit block diagram of a motor control device according to a first embodiment.

Hereafter, embodiments of the present application will be described, while referring to the drawings. Identical or corresponding portions will be illustrated with identical reference signs allotted in the drawings.

First Embodiment

FIG. 1 is a circuit block diagram of a motor control device according to a first embodiment, and shows a motor control device applied to an electric power steering device.

In FIG. 1, a motor control device 100 includes a first control unit 1a and a second control unit 1b. A motor 2 includes a pair of three-phase motor windings, those being a first motor winding 3a and a second motor winding 3b, and is controlled by the motor control device 100.

The motor control device 100 includes the first control unit 1a and the second control unit 1b, which are dedicated to the first motor winding 3a and the second motor winding 3b respectively, and the first control unit 1a includes an inverter circuit 5a that supplies a current to a CPU 4a, which is a control unit, and the motor 2. In the same way, the second control unit 1b includes an inverter circuit 5b that supplies a current to a CPU 4b, which is a control unit, and the motor 2.

Firstly, a circuit configuration of the motor control device 100 will be described. As the first control unit 1a and the second control unit 1b are of the same configuration, only the first control unit 1a will be described here.

Power from a battery 6a mounted in a vehicle is supplied to the first control unit 1a. Power supplied to the first control unit 1a may be supplied directly from the battery 6a, or may be supplied, for example, from an ignition switch (not shown) connected to the battery 6a. Information from sensors 7, such as a vehicle speed sensor that detects a traveling speed of the vehicle and a torque sensor, mounted in a vicinity of a steering wheel, that detects a steering torque, is transmitted to the CPU 4a. Based on these items of information, the CPU 4a computes and outputs a current value, which is a control amount for causing the motor 2 to rotate. A drive circuit 8a receives an output signal from the CPU 4a, and outputs a drive signal that drives each switching element of the inverter circuit 5a to the inverter circuit 5a.

The inverter circuit 5a includes three circuit units 9U, 9V, and 9W corresponding one to each phase of the first motor winding 3a. Further, a positive electrode side +B of the battery 6a and the inverter circuit 5a are connected, and a power supply voltage VBa from the battery 6a is supplied to the inverter circuit 5a. Also, the power supply voltage VBa is also input into the CPU 4a, and the CPU 4a measures the power supply voltage VBa using an AD conversion function of the CPU 4a.

Herein, as the three circuit units 9U, 9V, and 9W are of the same configuration, only the circuit unit 9U will be described. The circuit unit 9U includes an upper arm switching element 10U and a lower arm switching element 11U. The upper arm switching element 10U and the lower arm switching element 11U are driven by PWM (pulse width modulation) based on a command from the CPU 4a. Furthermore, a shunt resistor 12U that detects a current flowing to the motor 2 is connected in series to the serially-connected body of the upper arm switching element 10U and the lower arm switching element 11U. Further, a potential difference across both ends of the shunt resistor 12U is input into the CPU 4a. The potential difference is detected as a current flowing to the motor 2. A shunt resistor 12V is connected in series to a serially-connected body of an upper arm switching element and a lower arm switching element of the circuit unit 9V, and a shunt resistor 12W is connected in series to a serially-connected body of an upper arm switching element and a lower arm switching element of the circuit unit 9W.

The circuit units 9U, 9V, and 9W have the same circuit configuration with respect to U1 phase, V1 phase, and W1 phase windings respectively, and can independently supply a current to the respective windings. A ○ mark in FIG. 1 indicates a connection terminal for external equipment provided in the first control unit 1a and the second control unit 1b.

Also, terminal voltages of the first motor winding 3a and the second motor winding 3b are also input into the CPU 4a. These items of information are input into the CPU 4a, and by a difference between a detected value and a computed current value being computed and a so-called feedback control being carried out, a desired motor current is supplied, thereby assisting a steering force.

The CPU 4a and the CPU 4b are connected by a communication line 13 in order that the CPU 4a and the CPU 4b can exchange information with each other, and acquire the power supply voltage VBa or VBb of the other, and other information.

Herein, the motor 2 is a brushless motor including the delta-connected pair of the three-phase first motor winding 3a and second motor winding 3b, and a rotation sensor that detects a rotational position of a rotor (not shown) is installed. The rotation sensor is also configured of a pair of rotation sensors 14a and 14b in order to secure redundancy. Rotational positions from the rotation sensors 14a and 14b are input into the CPU 4a and CPU 4b respectively.

Although the motor 2 is described as being a three-phase motor, the motor 2 may also be a multiphase motor of four phases or more. Also, although the first motor winding 3a and the second motor winding 3b are configured by the three phases of windings being delta-connected, the first motor winding 3a and the second motor winding 3b may also be configured by the three phases of windings being star-connected. Also, although the motor 2 is described as being a three-phase brushless motor, the motor 2 may also be a brushed motor having two sets of two poles. Also, a distributed wiring or a concentrated wiring can be employed for the first motor winding 3a and the second motor winding 3b. Also, the motor 2 may be a so-called tandem motor having two stators. Whether there is only one set of windings or whether there is a pair of windings acting in conjunction, it is sufficient that a configuration is such that a desired motor rotation speed and torque can be output.

As heretofore described, the motor control device 100 is configured of two sets wherein a power supply, a circuit network, sensors, and the like are all independent, thereby securing redundancy.

Figure 2:
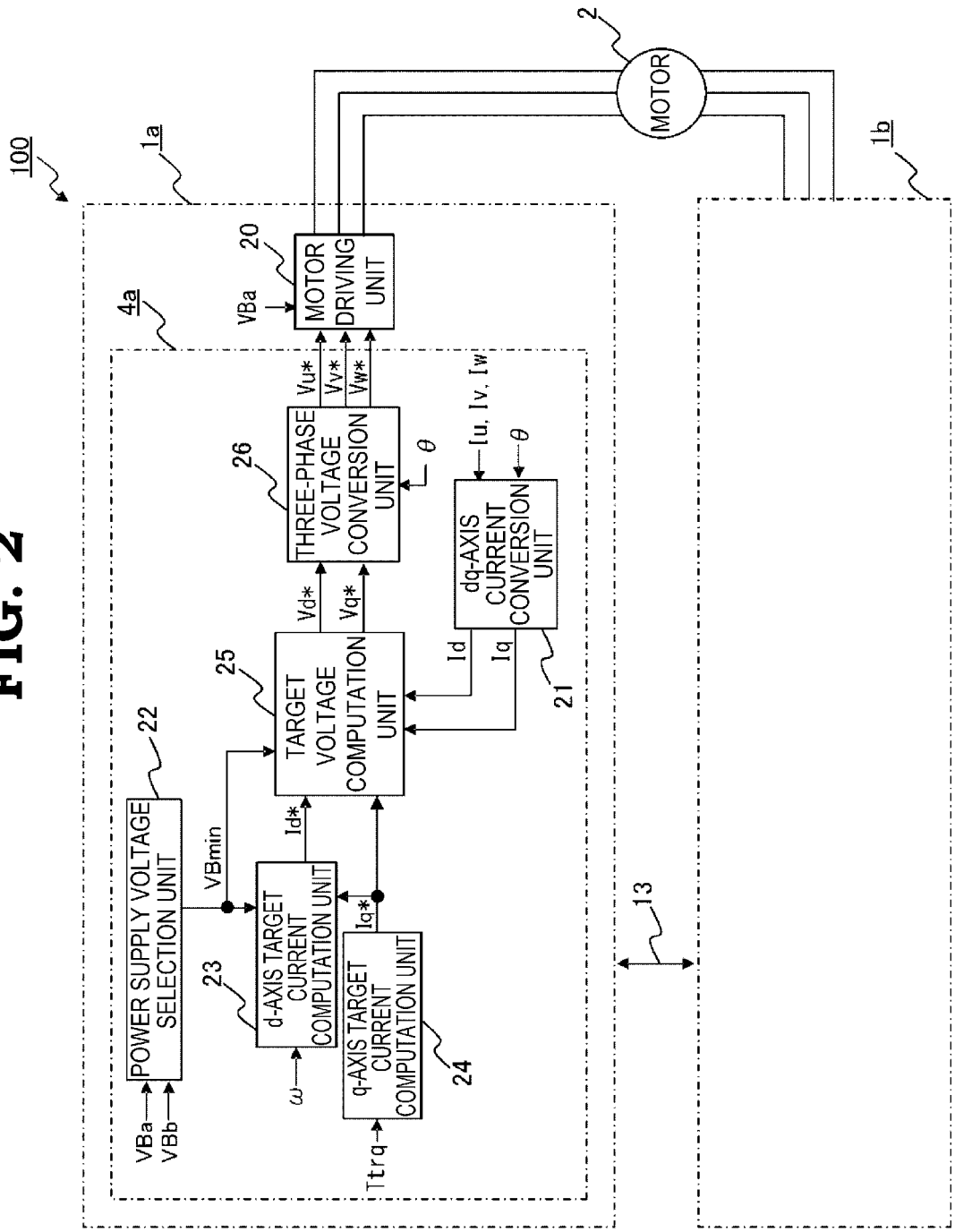
FIG. 2 is a control unit block diagram of a motor control device according to the first embodiment.

FIG. 2 is a control unit block diagram of a motor control device of the present embodiment. As the first control unit 1a and the second control unit 1b are of the same configuration, only the first control unit 1a will be described here.

The first control unit 1a includes the CPU 4a and a motor driving unit 20. The CPU 4a includes a dq-axis current conversion unit 21, a power supply voltage selection unit 22, a d-axis target current computation unit 23, a q-axis target current computation unit 24, a target voltage computation unit 25, and a three-phase voltage conversion unit 26. The dq-axis current conversion unit 21 converts three phases of detected current Iu, Iv, and Iw into a d-axis detected current Id and a q-axis detected current Iq based on a rotational position θ, and outputs the d-axis detected current Id and the q-axis detected current Iq. The rotational position θ is an input from the rotation sensor 14 shown in FIG. 1, and is positional information relating to the rotating rotor.

The three phases of detected current Iu, Iv, and Iw are currents flowing to the U1 phase, V1 phase, and W1 phase detected by the shunt resistors 12U, 12V, and 12W shown in FIG. 1. The d-axis detected current Id is a d-axis component in rotating coordinates of the d-axis and the q-axis, which are perpendicular to each other. Also, the q-axis detected current Iq is a q-axis component in rotating coordinates of the d-axis and the q-axis, which are perpendicular to each other.

Figure 3:
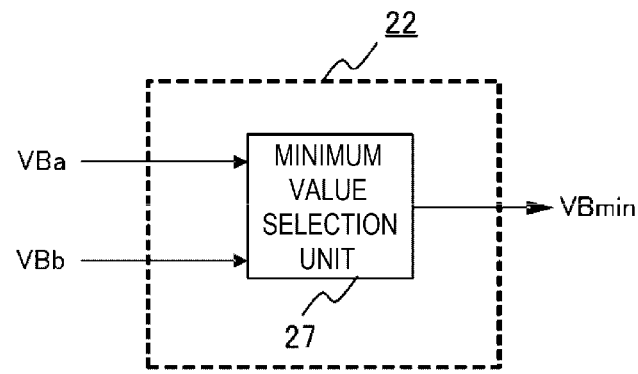
FIG. 3 is a block diagram showing an internal configuration of a power supply voltage selection unit according to the first embodiment.

The power supply voltages VBa and VBb are input into the power supply voltage selection unit 22, as shown in FIG. 3. A minimum value selection unit 27 compares the power supply voltages VBa and VBb, and outputs the lower voltage as a post-selection power supply voltage VBmin.

As the first control unit 1a is being described here, the power supply voltage VBa is an own-system power supply voltage, and the power supply voltage VBb is a power supply voltage of the second control unit 1b, which is an other system. The power supply voltage VBb of the second control unit 1b, which is the other system, is acquired from the second control unit 1b via the communication line 13. In the case of the second control unit 1b, the own system and the other system are switched. Also, the own system and the other system select the lower power supply voltage, because of which the own system and the other system control using the same power supply voltage.

In the present embodiment, the power supply voltage of the other system is acquired via the communication line 13, but provided that the power supply voltage of the other system can be acquired, the communication line 13 may be of any aspect. For example, memories may be shared in a dual-core microcomputer including two CPU cores in one package, and information relating to power supply voltage acquired by accessing each other's memory. Also, the power supply voltage of the other system may be input using an electrical signal line rather than communication data.

Returning to FIG. 2, the q-axis target current computation unit 24 computes and outputs a target q-axis current Iq* to be supplied to the motor 2 based on a target torque Ttrq. The target torque Ttrq is determined based on inputs from the torque sensor and the vehicle speed sensor, which are one portion of the sensors 7 shown in FIG. 1.

The d-axis target current computation unit 23 computes and outputs a target d-axis current Id* to be supplied to the motor 2 based on the target q-axis current Iq*, a motor rotation speed ω, and the post-selection power supply voltage VBmin. The motor rotation speed ω is a rate of change of the rotational position θ, and is calculated by differentiating the rotational position θ with respect to time. The optimum target d-axis current Id* for generating the target q-axis current Iq* is calculated from the motor rotation speed ω, a motor induced voltage calculated based on a motor rotor flux, motor inductance, and the power supply voltage. By using the selected lower power supply voltage in the d-axis target current computation, the target d-axis current Id* is standardized between the systems.

The target d-axis current Id* and the target q-axis current Iq* are rotating coordinate current commands relating to current to be supplied to the motor 2. The target d-axis current Id* is a d-axis component in rotating coordinates of the d-axis and the q-axis, which are perpendicular to each other. The target q-axis current Iq* is a q-axis component in rotating coordinates of the d-axis and the q-axis, which are perpendicular to each other.

The target voltage computation unit 25 computes and outputs a target q-axis voltage Vq* and a target d-axis voltage Vd* in rotating coordinates based on the target d-axis current Id* and the target q-axis current Iq*, the d-axis detected current Id and the q-axis detected current Iq, and the post-selection power supply voltage VBmin. Also, the target voltage computation unit 25 limits the target q-axis voltage Vq* and the target d-axis voltage Vd* based on the post-selection power supply voltage VBmin.

For example, the sum of the square of the target q-axis voltage Vq* and the square of the target d-axis voltage Vd* is limited so as not to exceed the square of the post-selection power supply voltage VBmin, as in the expression $(Vq^*)^2 + (Vd^*)^2 \leq (VBmin)^2$. It is sufficient that a method of distributing voltage to the target q-axis voltage Vq* and the target d-axis voltage Vd* is the same in the own system and the other system.

The three-phase voltage conversion unit 26 converts the target d-axis voltage Vd* and the target q-axis voltage Vq* into three-phase target voltages Vu*, Vv*, and Vw* based on the rotational position θ, and outputs the three-phase target voltages Vu*, Vv*, and Vw*. The three-phase target voltages Vu*, Vv*, and Vw* are voltages applied to the U1 phase, the V1 phase, and the W1 phase respectively of the motor 2.

The motor driving unit 20 drives the motor 2 based on the three-phase target voltages Vu*, Vv*, and Vw*. The motor driving unit 20 corresponds to the drive circuit 8a and the inverter circuit 5a shown in FIG. 1. The power supply voltage VBa is supplied to the motor driving unit 20, and the motor driving unit 20 supplies current to the motor 2 based on the three-phase target voltages Vu*, Vv*, and Vw*.

The power supply voltage VBb is supplied to a motor driving unit of the second control unit 1b.

By the target d-axis current Id* being computed in the d-axis target current computation unit 23 based on the post-selection power supply voltage VBmin, which is the lower voltage of the own system power supply voltage and the other system power supply voltage, in this way, a difference in the target d-axis current Id* occurring between the systems due to a difference in power supply voltage can be restricted. Because of this, an advantage is obtained in that vibration and noise of the motor 2 are restricted.

Also, by the target d-axis voltage Vd* and the target q-axis voltage Vq* being limited in the target voltage computation unit 25 based on the post-selection power supply voltage VBmin, the target d-axis voltage and the target q-axis voltage can be limited in the same way. Because of this, an advantage is obtained in that vibration and noise of the motor 2 are restricted.

Second Embodiment

Figure 4:
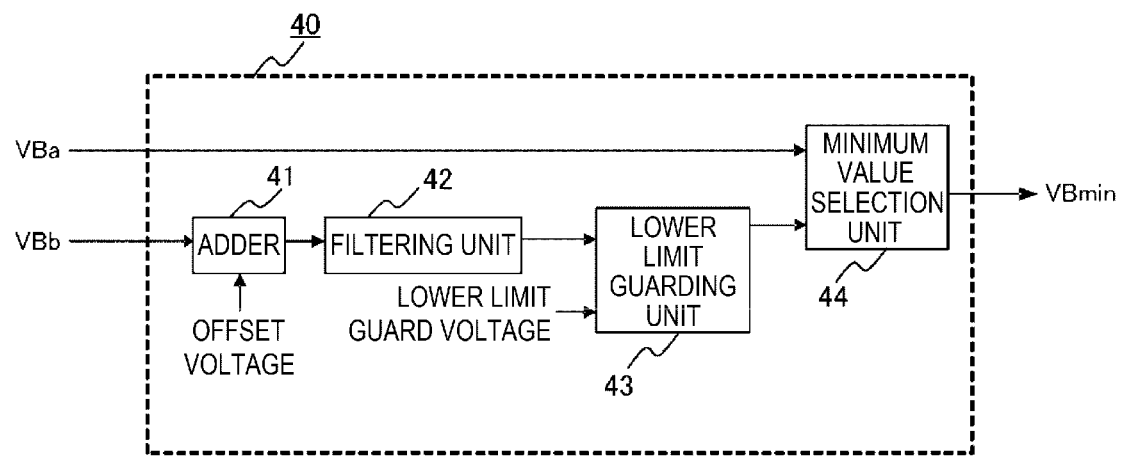
FIG. 4 is a block diagram showing an internal configuration of a power supply voltage selection unit of a motor control device according to a second embodiment.

Next, a motor control device according to a second embodiment will be described, with reference to FIG. 4. In the second embodiment, a power supply voltage selection unit differs from that in the first embodiment, while other portions are the same as in the first embodiment. Hereafter, a difference from the first embodiment will be described.

A power supply voltage selection unit 40 of a motor control device according to the second embodiment is such that three processes are added, one in each of an adder 41, a filtering unit 42, and a lower limit guarding unit 43. These three processes are added to the process as far as the other system power supply voltage VBb, which is the power supply voltage of the other system, being input into a minimum value selection unit 44.

Herein, a combination of the three processes will be described, but any one process alone may be added, and any two processes may be added in combination.

An offset voltage is added to the other system power supply voltage VBb in the adder 41. The offset voltage is a voltage such that vibration or noise of the motor 2 is acceptable, even when a difference in output results occurs in a process using the post-selection power supply voltage VBmin.

Owing to the offset voltage being added, the control unit with the higher power supply voltage can drive the motor 2 at a voltage higher by at most an amount equivalent to the offset voltage.

For example, it is assumed that VBa=13V, VBb=10V, and offset voltage=1V. The first control unit 1a drives the motor 2 with the post-selection power supply voltage VBmin at 11V. The second control unit 1b drives the motor 2 with the post-selection power supply voltage VBmin at 10V. The first control unit 1a with the higher power supply voltage drives the motor 2 at a voltage higher by the offset voltage (=1V) with respect to that of the second control unit 1b.

The offset voltage of 1V shown in this example is a value for describing an operation of the adder 41 easily.

Because of this, an output of the motor 2 can be increased, while restricting vibration and noise of the motor 2.

In the filtering unit 42, an effect of noise or the like of the other system power supply voltage VBb is restricted, and an effect on an output to the motor 2 from the own system is restricted. For example, the filtering unit 42 is configured of a first-order lag filter.

In the lower limit guarding unit 43, the other system power supply voltage VBb and a lower limit guard voltage are compared, and the higher voltage is output. That is, this is a process of selecting a maximum value. The lower limit guard voltage is a voltage such that a decrease in output of the motor 2 is acceptable. Limiting the other system power supply voltage VBb with the lower limit guard voltage means that when an abnormality occurs in the other system and the power supply voltage decreases noticeably, an accompanying effect of the own system on the motor 2 is restricted, and a minimum necessary output to the motor 2 can be maintained.

As the other system power supply voltage VBb is acquired via the communication line 13, the filtering unit 42 and the lower limit guarding unit 43 can restrict an effect of an abnormality in the communication line 13 in addition to that of an abnormality in the control unit of the other system (in this description, the second control unit 1b).

By the adder 41 adding the offset voltage to the other system power supply voltage VBb in this way, the output of the motor 2 can be increased, while restricting vibration and noise of the motor 2.

Also, the filtering unit 42 can restrict an effect on the output from the own system to the motor 2 caused by the effect of noise or the like of the other system power supply voltage VBb.

The lower limit guarding unit 43 restricts an effect on the output from the own system to the motor 2 caused by a noticeable decrease in the other system power supply voltage VBb, whereby a minimum necessary output to the motor 2 can be maintained.

Third Embodiment

Next, a third embodiment will be described. The third embodiment describes an example wherein the motor control device 100 described in the first embodiment or the second embodiment is applied to an electric power steering device 150 mounted in a vehicle.

Figure 5:
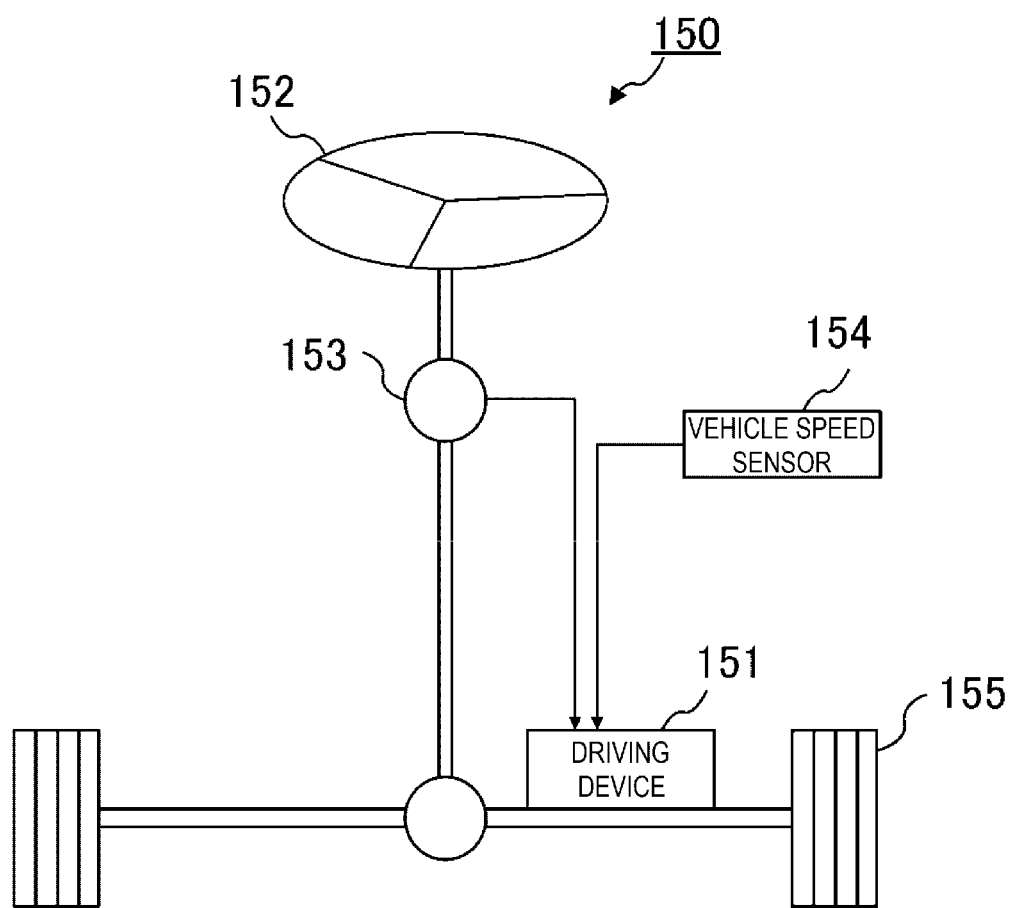
FIG. 5 is a block diagram showing an overall configuration of an electric power steering device according to a third embodiment.

FIG. 5 is a block diagram showing an overall configuration of the electric power steering device 150 according to the third embodiment. In FIG. 5, a driving device 151 is shown as a device that includes, in an integrated manner, the motor control device 100 and the motor 2 described in the first embodiment or the second embodiment.

On a driver of the vehicle causing a steering mechanism of the vehicle to generate a steering torque using a steering wheel 152, a torque sensor 153 detects the steering torque, and outputs the steering torque to the driving device 151. Also, a vehicle speed sensor 154 detects a traveling speed of the vehicle, and outputs the traveling speed to the driving device 151. The torque sensor 153 and the vehicle speed sensor 154 are one portion of the sensors 7 shown in FIG. 1, and correspond to the torque sensor and the vehicle speed sensor described in the first embodiment.

The driving device 151 generates an auxiliary torque that assists the steering torque from the motor 2, based on the steering torque input from the torque sensor 153 and the traveling speed input from the vehicle speed sensor 154, and supplies the auxiliary torque to a steering mechanism of a front wheel 155 of the vehicle. The driving device 151 may also be configured in such a way as to generate an auxiliary torque based on an input other than those of the torque sensor 153 and the vehicle speed sensor 154.

By the motor control device 100 described in the first embodiment or the second embodiment being applied to the electric power steering device 150, vibration or noise occurring in the motor 2 is restricted, thereby reducing an unpleasant sensation for the driver.

Although the present application is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST 1a first control unit, 1b second control unit, 2 motor, 3a first motor winding, 3b second motor winding, 4a, 4b CPU, 5a, 5b inverter circuit, 6a battery, 7 sensors, 8a drive circuit, 9U, 9V, 9W circuit unit, 10U upper arm switching element, 11U lower arm switching element, 12U, 12V, 12W shunt resistor, 13 communication line, 14a, 14b circuit sensor, 20 motor driving unit, 21 dq-axis current conversion unit, 22, 40 power supply voltage selection unit, 23 d-axis target current computation unit, 24 q-axis target current computation unit, 25 target voltage computation unit, 26 three-phase voltage conversion unit, 27 minimum value selection unit, 41 adder, 42 filtering unit, 43 lower limit guarding unit, 100 motor control device, 150 electric power steering device, 151 driving device, 152 steering wheel, 153 torque sensor, 154 vehicle speed sensor, 155 front wheel, VBa, VBb power supply voltage, VBmin post-selection power supply voltage, θ rotational position, Iu, Iv, Iw three-phase detected current, Id d-axis detected current, Iq q-axis detected current, Iq* target q-axis current, Id* target d-axis current, Ttrq target torque, ω motor rotation speed, Vq* target q-axis voltage, Vd* target d-axis voltage, Vu* Vv*, Vw* three-phase target voltage.

The invention claimed is:

1. A motor control device that drives a motor including a first motor winding and a second motor winding, wherein
the motor control device includes a first controller that drives the first motor winding and a second controller that drives the second motor winding, each of the first controller and the second controller includes a motor driving circuitry and a control circuitry to which a power supply voltage is supplied,
the first controller and the second controller acquire the power supply voltage of the other controller, each of the control circuitries includes a power supply voltage selection circuitry having a minimum value selection circuitry and a d-axis target current computation circuitry,
the minimum value selection circuitry selects the lower of a value of an own power supply voltage input into the power supply voltage selection circuitry and a value of the power supply voltage of the other controller, and outputs the selected value from the power supply voltage selection circuitry as a post-selection power supply voltage,
the post-selection power supply voltage is input into the d-axis target current computation circuitry, and the d-axis target current computation circuitry outputs a target d-axis current using the post-selection power supply voltage.

2. The motor control device according to claim 1, wherein
the control circuitry includes a target voltage computation circuitry, and
the target voltage computation circuitry outputs a target q-axis voltage and a target d-axis voltage using the post-selection power supply voltage.

3. The motor control device according to claim 1, wherein
the power supply voltage selection circuitry includes an adder that adds an offset voltage to the power supply voltage of the other controller, and an output of the adder is input into the minimum value selection circuitry.

4. The motor control device according to claim 1, wherein
the power supply voltage selection circuitry includes a filtering circuitry into which the power supply voltage of the other controller is input, and an output of the filtering circuitry is input into the minimum value selection circuitry.

5. The motor control device according to claim 1, wherein
the power supply voltage selection circuitry includes a lower limit guarding circuitry into which the power supply voltage of the other controller is input, and an output of the lower limit guarding circuitry is input into the minimum value selection circuitry.

6. An electric power steering device, comprising:
a driving device including the motor control device according to claim 1 and the motor controlled by the motor control device;
a torque sensor that detects a steering torque generated in a steering mechanism of a vehicle and outputs the steering torque to the driving device; and
a vehicle speed sensor that detects a traveling speed of the vehicle and outputs the traveling speed to the driving device.

7. The motor control device according to claim 2, wherein
the power supply voltage selection circuitry includes an adder that adds an offset voltage to the power supply voltage of the other controller, and an output of the adder is input into the minimum value selection circuitry.

8. The motor control device according to claim 2, wherein
the power supply voltage selection circuitry includes a filtering circuitry into which the power supply voltage of the other controller is input, and an output of the filtering circuitry is input into the minimum value selection circuitry.

9. The motor control device according to claim 2, wherein
the power supply voltage selection circuitry includes a lower limit guarding circuitry into which the power supply voltage of the other controller is input, and an output of the lower limit guarding circuitry is input into the minimum value selection circuitry.

10. An electric power steering device, comprising:
a driving device including the motor control device according to claim 2 and the motor controlled by the motor control device;
a torque sensor that detects a steering torque generated in a steering mechanism of a vehicle and outputs the steering torque to the driving device; and
a vehicle speed sensor that detects a traveling speed of the vehicle and outputs the traveling speed to the driving device.

11. An electric power steering device, comprising:
a driving device including the motor control device according to claim 3 and the motor controlled by the motor control device;
a torque sensor that detects a steering torque generated in a steering mechanism of a vehicle and outputs the steering torque to the driving device; and
a vehicle speed sensor that detects a traveling speed of the vehicle and outputs the traveling speed to the driving device.

12. An electric power steering device, comprising:
a driving device including the motor control device according to claim 4 and the motor controlled by the motor control device;
a torque sensor that detects a steering torque generated in a steering mechanism of a vehicle and outputs the steering torque to the driving device; and
a vehicle speed sensor that detects a traveling speed of the vehicle and outputs the traveling speed to the driving device.

13. An electric power steering device, comprising:
a driving device including the motor control device according to claim 5 and the motor controlled by the motor control device;
a torque sensor that detects a steering torque generated in a steering mechanism of a vehicle and outputs the steering torque to the driving device; and
a vehicle speed sensor that detects a traveling speed of the vehicle and outputs the traveling speed to the driving device.

* * * * *